United States Patent Office 3,215,654
Patented Nov. 2, 1965

3,215,654
PROCESS FOR PREPARING AQUEOUS SOLUTIONS OF ALKYLATED AMINOPOLYAMIDE-EPICHLOROHYDRIN RESINS AND USE OF SAME AS RETENTION AIDS
Alfred Chandler Schmalz, Wilmington, Del., assignor to Hercules Powder Company, Wilmington, Del., a corporation of Delaware
No Drawing. Filed Apr. 14, 1961, Ser. No. 102,955
10 Claims. (Cl. 260—17.3)

This invention relates to alkylated aminopolyamide-epichlorohydrin resins and to the use of same as retention aids for paper fillers and the like.

In the manufacture of paper filled with inorganic fillers such as calcium carbonate, titanium dioxide, various clays including kaolin and so on, it is desirable to retain the maximum amount of filler from the pulp slurry in the sheet. It is known that polyamide-epichlorohydrin resins substantially improve the retention of such fillers when added to the pulp slurry prior to sheet formation. These resins, however, impart substantial wet-strength to the sheet when used at higher levels of addition, i.e., above 0.5% by weight, based on the dry weight of the sheet. In some cases wet-strength is not desired and, hence, is a disadvantage. Moreover, some of these resins are stable only as 10–25% aqueous solutions.

An important object of the invention is the provision of novel cationic water-soluble resins which effectively improve the retention of fillers and the like in paper, while at the same time imparting minimal wet-strength thereto.

A further object of the invention is the provision of a resin of the indicated type which is stable at higher solids concentrations, i.e., at solids concentrations up to about 50%.

It has now been discovered that alkylated aminopolyamide-epichlorohydrin resins can be prepared which are stable at up to about 50% solids and which effectively improve the retention of fillers and the like in paper while imparting minimal wet-strength thereto. The alkylation may be accomplished by reacting the aminopolyamide with formic acid and formaldehyde under the conditions of the Eschweiler-Clark modification of the Leuckart reaction [Organic Reactions V, page 301 (New York, 1949)], by reacting the aminopolyamide with alkylating agents or by reacting the aminopolyamide-epichlorohydrin resin with alkylating agents. In excess of 75% of the amino nitrogens originally present in the aminopolyamide are quaternary in the final resins.

Having described the invention generally, the following examples are given. Examples 1–3 illustrate the preparation of resins in accordance with the invention, and Example 4 illustrates the preparation of an aminopolyamide-epichlorohydrin wet-strength resin for purposes of comparison with the resins of Examples 1–3.

EXAMPLE 1

An aminopolyamide was prepared as follows: 200 parts of diethylenetriamine and 96.3 parts of water were charged to a reaction vessel equipped with an agitator. The agitator was started, and 290 parts of adipic acid was added at the rate of about 18.7 parts per six minutes. After the acid was added, the temperature of the charge was raised to 170° c.±5° C. and held there for 1.5 to 3 hours. The reaction mixture was then cooled to 140° C. and diluted with sufficient water to adjust the solids content to about 50%. The product was then cooled to 25° C.

To 200 parts of the above aminopolyamide was added 55.2 parts formic acid (90% basis) and 42.0 parts formaldehyde. The mixture was heated at temperatures from about 70° C. to about 90° C. until evolution of carbon dioxide ceased, and heating was then continued to reflux.

The mixture was cooled, the pH adjusted to 8.3 to 8.5, and 47 parts of water and 47.8 parts of epichlorohydrin were added. The mixture was reacted until the Gardner-Holdt viscosity at 25% solids and 25° C. had reached about C–E. Eighty-six parts water and sufficient 93% sulfuric acid were then added to lower the pH to 4.5 to 4.7. The mixture was then heated at 50–60° C. until the viscosity had reached K–M, following which the mixture was cooled to about 25° C. and sufficient sulfuric acid added to reduce the pH to 3.8 to 4.0. The product contained about 35% solids and has an intrinsic viscosity in 0.1 N NH$_4$Cl at 25° C. of 0.3.

EXAMPLE 2

An aminopolyamide was prepared as described in the first paragraph of Example 1. It had a solids content of 48.5%. To 206 parts of this polyamide solution in 50 ml. of water was added 51.3 parts of epichlorohydrin over a 10-minute interval. The solution was heated at 54–56° C. for 2½ hours. The pH was 8.5 and the Gardner-Holdt viscosity at 25° C. and 25% solids was Q. Dimethyl sulfate (59 parts) was added and the temperature raised to 70–75° C for 45 minutes. Sodium carbonate (20 parts) was added portionwise during this period to keep the solution basic to thymol blue. The pH was adjusted to 4.0 with 10% sulfuric acid. The resulting solution had a Gardner Holdt viscosity of H and contained 37.2% solids.

EXAMPLE 3

An aminopolyamide was prepared as follows: 225 parts of imino-bis-propylamine and 96.3 parts of water were charged to a reaction vessel equipped with an agitator. The agitator was started and 290 parts of adipic acid was added at the rate of about 18.7 parts per six minutes. After the acid was added, the temperature of the charge was raised to 175° C. and held there for 3 hours. The aminopolyamide contained 49.8% solids.

The aminopolyamide (201 grams) was alkylated with dimethyl sulfate (13.2 grams) by adding the latter dropwise to the stirred aminopolyamide at 180° C. during 12 minutes. The reaction mixture was held at 180° C. for 25 minutes and then diluted with 100 ml. of hot water.

The alkylated aminopolyamide (58.2 grams containing 54.2% solids) was reacted with epichlorohydrin (12.5 grams) in the presence of water (90 ml.) at 65–70° C. for about 6.3 hours. The product contained 30.9% total solids and was stable for more than 5 months at room temperature.

EXAMPLE 4

An aminopolyamide containing 52.3% solids was prepared following the procedure set forth in the first paragraph of Example 1.

To 60 parts of this aminopolyamide solution was added 225 parts of water. This solution was heated to 50° C. and 12.5 parts of epichlorohydrin was added dropwise over a period of 11 minutes. The contents of the flask was then heated to 60–70° C. until it had attained a Gardner-Holdt viscosity of >E. Then 150 parts of water was added to the product, and it was cooled to 25° C. Eleven parts of 3.7% hydrochloric acid was then added to adjust the pH to 5.0. The product contained 10% solids and had a Gardner-Holdt viscosity of C–D.

EXAMPLE 5

The resins of Examples 1–4 were evaluated as retention aids in the following manner: Tacoma bleached kraft pulp was beaten at 2.5% consistency to 750 cc.

Schopper-Riegler freeness in a Valley beater. The pulp was diluted to 0.5% consistency with distilled water and the filler added as a 10% slurry prepared at least 48 hours in advance. For alum-free runs, the pH was adjusted to 6.5 with 5% sulfuric acid. For alum runs, the pH was adjusted to 7.0 with 5% sulfuric acid, the necessary amount of 10% alum solution added to the pulp-filler slurry to give 1% based on dry pulp and the pH then adjusted to 4.5 with 5% sulfuric acid. The necessary amount of retention aid solution (1 ounce of 0.0042% solution of the resin for 0.1% based on dry pulp) was added to 225 mls. of the pulp-filler slurry and stirred for 30 seconds. A handsheet was formed using a 40-mesh wire on a laboratory handsheet apparatus. The sheets were wet pressed and drum dried. The retention was determined by ash analysis of the sheets. The results are summarized in Table 1 below.

Table 1

| Resin From— | Percent Retention | | | |
|---|---|---|---|---|
| | 10% Kaolin | | 10% TiO₂ | |
| | 1% alum | pH 6.5 acid | 1% alum | pH 6.5 acid |
| Example 1 | 79 | 54 | 90 | 89 |
| Example 4 | 79 | 64 | 90 | 91 |
| Control (No resin) | 35 | 11 | 43 | 16 |
| Example 2 | 67 | 66 | 48 | 60 |
| Example 4 | 70 | 55 | 67 | 57 |
| Control (No resin) | 34 | 8 | 43 | 10 |
| Example 3 | | 51 | 67 | 19 |
| Control (No resin) | | 11 | 55 | 10 |

EXAMPLE 6

The resins of Examples 1–4 were tested for wet-strength efficiency using the following procedure: Tacoma bleached kraft pulp was beaten to a Schopper-Riegler freeness of 750 cc. in a Noble and Wood cycle beater. The pH of the pulp was 7.5 to 7.8. To the pulp was added various percentages by weight, based on the weight of dry pulp, of the resins from Examples 1, 2, 3 and 4. The pulp was sheeted on a Noble and Wood handsheet machine using a closed system. The white water contained 50 p.p.m. sulfate ion and had been adjusted to pH 7.5 with sodium bicarbonate solution. The resulting handsheets were run through press rolls and drum dried according to the usual procedure. Portions of the resulting handsheets were cured for 1 hour at 105° C. The sheets tested for wet-strength were soaked for 2 hours in distilled water. Results are listed in Table 2 below.

Table 2

| Test No. | Resin From— | Percent Added—dry basis weight | Tensile (lb./in. width) | | |
|---|---|---|---|---|---|
| | | | Dry—Uncured | Wet | |
| | | | | Uncured | Cured |
| 1 | Example 4¹ | 0.4 | 25 | 4.2 | 6.2 |
| | | 1.0 | 26 | 5.9 | 9.0 |
| | | 2.0 | 25 | 6.5 | 10.1 |
| | Example 1 | 0.4 | 23 | 2.5 | 3.6 |
| | | 1.0 | 24 | 3.8 | 4.9 |
| | | 2.0 | 24 | 4.5 | 5.8 |
| 2 | Example 4¹ | 0.4 | | 4.7 | 7.5 |
| | | 1.0 | | 7.0 | 11.1 |
| | Example 2 | 0.4 | | 2.6 | 4.0 |
| | | 1.0 | | 4.5 | 6.4 |
| 3 | Example 4¹ | 0.4 | 28 | 4.4 | 7.3 |
| | | 1.0 | 27 | 6.5 | 10.2 |
| | | 2.0 | 28 | 7.5 | 12.1 |
| | Example 3 | 0.4 | 28 | 1.4 | 3.7 |
| | | 1.0 | 30 | 2.1 | 5.2 |
| | | 2.0 | 31 | 3.1 | 6.8 |

¹ Wet-strength resin.

It is evident from the examples that the resins of the invention are highly effective retention aids for fillers for paper, being comparable in this respect to known polyamide-epichlorohydrin type wet-strength resins, but differing from such resins in that they impart substantially less wet-strength to the paper. Where wet-strength is not desired, this is a very definite advantage since, among other things, it makes the reworking of broke less difficult.

The aminopolyamides contemplated for use in preparing the cationic resins of the invention are obtained by reacting a saturated aliphatic dicarboxylic acid containing from 3–10 carbon atoms with a polyalkylene polyamine, preferably in aqueous solution, under conditions such as to produce a water-soluble polyamide containing the recurring groups $$-NH(C_nH_{2n}HN)_x-CORCO-$$

where $n$ and $x$ are each 2 or more and R is the divalent hydrocarbon radical of the dicarboxylic acid. Typical acids suitable for use herein are diglycolic, succinic, adipic, azelaic and the like. The saturated dicarboxylic acids having from 4–8 carbon atoms in the molecule are preferred. Blends of two or more of the saturated dicarboxylic acid may also be used.

A variety of polyalkylene polyamines including polyethylene polyamines, polypropylene polyamines, polybutylene polyamines and so on may be employed herein of which the polyethylene polyamines represent an economically preferred class. More specifically, the polyalkylene polyamines of this invention may be represented as polyamines in which the nitrogen atoms are linked together by groups of the formula $-C_nH_{2n}-$ where $n$ is a small integer greater than unity and the number of such groups in the molecule ranges from two up to about eight. The nitrogen atoms may be attached to adjacent carbon atoms in the group $-C_nH_{2n}-$ or to carbon atoms further apart, but not to the same carbon atom.

This invention contemplates not only the use of such polyamines as diethylenetriamine, triethylenetetramine, tetraethylenepentamine, dipropylenetriamine and the like, which can be obtained in reasonably pure form, but also mixtures and various crude polyamine materials. For example, the mixture of polyethylene polyamines obtained by the reaction of ammonia and ethylene dichloride, defined only to the extent of removal of chlorides, water, excess ammonia, and ethylenediamine, is a very satisfactory starting material. The term "polyalkylene polyamine" employed in the claims, therefore, refers to and includes any of the polyalkylene polyamines referred to above or to a mixture of such polyalkylene polyamines.

The temperatures employed for carrying out the reaction between the dicarboxylic acid and the polyalkylene polyamine may vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures may be utilized. The time of reaction depends on the temperatures and pressures utilized and will ordinarliy vary from about ½ to 2 hours, although shorter or longer reaction times may be utilized depending on reaction conditions.

In carrying out the reaction, it is preferred to use an amount of dicarboxylic acid sufficient to react substantially completely with the primary amine groups of the polyalkylene polyamine but insufficient to react with the secondary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel, while mole ratios above 1.4:1 result in low molecular weight polyamides.

The aminopolyamides, formed as above described, are converted to the cationic resins of the invention by reaction with a suitable alkylating agent and epichlorohydrin. Several procedures can be used.

In accordance with one procedure, the aminopolyamide is first reacted with the alkylating agent and the resulting product then reacted with epichlorohydrin. In an alternative procedure, the aminopolyamide can first be reacted with epichlorohydrin and then with the alkylating agent.

When utilizing the first procedure referred to in the preceding paragraph, the aminopolyamide is reacted with the alkylating agent at temperatures from about 40° C. to about 200° C. and at atmospheric pressures. Any suitable alkylating agent can be used for the purpose. These include the lower alkyl esters of mineral acids such as the halides, sulfates and phosphates, substituted alkyl halides and so on. Illustrative of the compounds which may be used are dimethyl, diethyl and dipropyl sulfate, methyl chloride, methyl iodide, methyl bromide, ethyl bromide, propyl bromide, the mono-, di- or tri-methyl, ethyl and propyl phosphates, 1,3-dichloropropanol-2, 1-chloroglycerol and so on. Certain aromatic compounds may also be used. Typical of these are benzyl chloride and methyl p-toluene sulfonate.

The amount of alkylating agent used should be such that in excess of 75% of the amino nitrogens initially present in the aminopolyamide are converted to quaternary nitrogens in the final product obtained by reaction with epichlorohydrin in the manner hereinafter described. This will usually require from about 0.25 mole to about 1.75 moles of alkylating agent per mole of secondary amine group of the aminopolyamide or an amount sufficient to convert from about 25% to about 100% of all the secondary amine groups of the aminopolyamide to tertiary amine groups and up to 75% of the tertiary amine groups initially present or formed during the reaction to quaternary groups.

The aminopolyamide can also be alkylated with formic acid and formaldehyde. In carrying out this alkylation the secondary amine groups of the aminopolyamide are hydroxymethylated with sufficient formaldehyde to react with 25% to 100% of these amino nitrogens. The hydroxymethyl group is reduced with formic acid using at least two or more moles of formic acid per mole of formaldehyde and sufficient formic acid to maintain the pH below 6.0 during the course of the reaction. The solution is heated at 40° C. to 100 C. until the evolution of carbon dioxide is essentially complete.

The alkylated aminopolyamide, formed in this manner, is then reacted with epichlorohydrin in aqueous solution at a pH from about 7.5 to about 9.5 and at a temperature from about 40° C. to about 100° C. until the viscosity of a 25% solids solution at 25° C. reaches about E on the Gardner-Holdt scale. The pH may then be adjusted to about 4.0 to about 5.0 to moderate the reaction and the mixture heated at a temperature from about 40° C. to 100° C. until the viscosity of a 25% solids solution at 25° C. reaches about K–M on the Gardner-Holdt scale. When the desired viscosity is reached, the product is cooled to about 25° C. and then stabilized by adjusting the pH from about 3.5 to 5.0 by the addition of a suitable acid such as sulfuric, hydrochloric, formic and the like.

In the alkylated aminopolyamide-epichlorohydrin reaction the amount of epichlorohydrin may vary from about 0.5 mole to about 1.8 moles per mole amino group of the alkylated aminopolyamide. The preferred amount of epichlorohydrin is from about 0.9 mole to about 1.5 moles per mole of amino group of the alkylated aminopolyamide.

In following the second procedure referred to above, the aminopolyamide is first reacted with from about 0.5 mole to about 1.8 moles, and preferably from about 0.9 mole to about 1.5 moles, per mole of amino group of the aminopolyamide, of epichlorohydrin. This reaction may be carried out at temperatures from about 40° C. to about 100° C. and preferably between about 45° C. and about 70° C. in aqueous solution and is continued until the viscosity of a 25% solids solution at 25 C. has reached about C or higher on the Gardner-Holdt scale.

The alkylating agent may be added after the completion of the above reaction or prior thereto and reacted at temperatures from about 40° C. to about 100° C., this reaction being continued until substantially all of the alkylating agent has reacted, i.e., the pH remains essentially constant. If desired, the pH may be adjusted to about 5.0 by the addition of a suitable acid such as sulfuric, hydrochloric, formic or the like. This step, however, is not necessary for a satisfactory product.

The amount of alkylating agent used in the second procedure should be sufficient to insure that in excess of 75% of the amino groups initially present in the aminopolyamide are converted to quaternary groups in the final product. This will usually require from about 0.25 mole to about 1.25 moles of alkylating agent per mole of amino nitrogen originally present in the aminopolyamide.

The cationic resins of the invention are effective retention aids for a wide variety of fillers and other materials. Exemplary of these are calcium carbonate, various clays such as kaolin, titanium dioxide and the like.

In this use the retention aid is usually added to the pulp-filler slurry just prior to sheet formation, i.e., at the fan pump, Bird screen, head-box or the like in an amount from about 0.002% to about 1.0% by weight, based on the dry weight of fibers. It may, however, be added at an earlier point in the papermaking system. The order of addition of alum, filler and retention aid may also be varied with satisfactory results. These retention aids are also effective in alum-free, acidic or alkaline systems.

The present invention thus provides a cationic resin which is stable at higher solids concentrations and which effectively improves the retention of fillers in paper while at the same time imparting minimal wet-strength thereto. The resins of the invention may also be used as flocculating agents in aqueous suspensions such as industrial waste water, sewage, slurries and the like. For example, they may be used to flocculate the solids in "white water" to improve the separation of the suspended solids.

What I claim and desire to protect by Letters Patent is:

1. A process of preparing an aqueous solution of a cationic resin which comprises (1) reacting a polyalkylene polyamine having two primary amine groups and from one to seven secondary amine groups with a $C_3$–$C_{10}$ saturated aliphatic dicarboxylic acid to form a water-soluble long chain aminopolyamide, the mole ratio of polyalkylene polyamine to dicarboxylic acid being from about 0.8:1 to about 1.4:1, (2) reacting the aminopolyamide with epichlorohydrin and an alkylating agent to form the aqueous solution of a cationic resin, the mole ratio of epichlorohydrin to amino groups of the aminopolyamide being from about 0.5:1 to about 1.8:1 and the mole ratio of alkylating agent to amino groups of the aminopolyamide being sufficient to convert in excess of 75% of the amino groups initially present in the aminopolyamide to quaternary groups in the product, and (3) terminating the reaction after more than 75% of the amino groups initially present in the aminopolyamide have been converted to quaternary groups.

2. A process of preparing an aqueous solution of a cationic resin which comprises (1) reacting a polyalkylene polyamine having two primary amine groups and from one to seven secondary amine groups with a $C_3$–$C_{10}$ saturated aliphatic dicarboxylic acid to form a water-soluble long chain aminopolyamide, the mole ratio of polyalkylene polyamine to dicarboxylic acid being from about 0.8:1 to about 1.4:1, (2) reacting the aminopolyamide with an alkylating agent, the mole ratio of alkylating agent to amino groups of the aminopolyamide being from about 0.25:1 to about 1.75:1, (3) reacting the resulting alkylated aminopolyamide with epichlorohydrin in a mole ratio of epichlorohydrin to amino groups of the alkylated aminopolyamide of from about 0.5:1 to about 1.8:1, the amount of alkylating agent being sufficient to insure converting in excess of 75% of the original amino nitrogens of the aminopolyamide to quaternary nitrogens in the product, and (4) terminating the reaction after more than 75% of the amino nitrogens initially present in the aminopolyamide have been converted to quaternary nitrogens.

3. A process of preparing an aqueous solution of a cationic resin which comprises (1) reacting a polyalkylene polyamine having two primary amine groups and from one to seven secondary amine groups with a $C_3$–$C_{10}$ saturated aliphatic dicarboxylic acid to form a water-soluble long chain aminopolyamide, the mole ratio of polyalkylene polyamine to dicarboxylic acid being from about 0.8:1 to about 1.4:1, (2) reacting the aminopolyamide with epichlorohydrin in a mole ratio of epichlorohydrin to amino groups of the aminopolyamide of from about 0.5:1 to about 1.8:1 to form an aqueous solution of a cationic resin, and (3) reacting the resulting product for a time and with sufficient alkylating agent to convert in excess of 75% of the original amino nitrogens of the aminopolyamide to quaternary nitrogens in the product.

4. A process in accordance with claim 2 wherein the alkylating agent is a combination of formic acid and formaldehyde.

5. A process in accordance with claim 2 wherein the alkylating agent is dimethyl sulfate.

6. A process in accordance with claim 2 wherein the alkylating agent is methyl iodide.

7. A process in accordance with claim 3 wherein the alkylating agent is dimethyl sulfate.

8. A process in accordance with claim 3 wherein the alkylating agent is methyl iodide.

9. In a process of making a formed cellulosic product by the steps of preparing an aqueous suspension of fibrous cellulosic material, adding thereto a filler and forming the thus treated cellulosic material into a filled product, the improvement comprising incorporating in said aqueous suspension of fibrous cellulosic material along with said filler from about 0.002% to about 1.0%, based on the dry weight of fibers, of a water-soluble cationic resin obtained by (1) reacting a polyalkylene polyamine having two primary amine groups and from one to seven secondary amine groups with a $C_3$–$C_{10}$ saturated aliphatic dicarboxylic acid to form a water-soluble long chain aminopolyamide, the mole ratio of polyalkylene polyamine to dicarboxylic acid being from about 0.8:1 to about 1.4:1, (2) reacting the aminopolyamide with epichlorohydrin and an alkylating agent to form an aqueous solution of the cationic resin, the mole ratio of epichlorohydrin to amino groups of the aminopolyamide being from about 0.5:1 to about 1.8:1 and the mole ratio of alkylating agent to amino groups of the aminopolyamide being sufficient to convert in excess of 75% of the original amino nitrogens of the aminopolyamide to quaternary nitrogens in the product, and (3) terminating the reaction after more than 75% of the amino nitrogens initially present in the aminopolyamide have been converted to quaternary nitrogens.

10. An aqueous solution of a cationic resin produced in accordance with the process of claim 1.

References Cited by the Examiner

UNITED STATES PATENTS

| | | | |
|---|---|---|---|
| 2,882,185 | 4/59 | Valko et al. | 260—78 |
| 2,926,154 | 2/60 | Keim | 260—78 |
| 2,989,364 | 6/61 | Goldann | 260—78 |

JOSEPH L. SCHOFER, *Primary Examiner.*

LEON J. BERCOVITZ, *Examiner.*